US011946026B2

(12) United States Patent
Teixeira et al.

(10) Patent No.: US 11,946,026 B2
(45) Date of Patent: Apr. 2, 2024

(54) FABRIC CARE COMPOSITION AND METHOD FOR IMPROVING FRAGRANCE INTENSITY WITH ISOPROPYL MYRISTATE

(71) Applicant: INTERNATIONAL FLAVORS & FRAGRANCES INC., New York, NY (US)

(72) Inventors: Miguel A. Teixeira, Oporto (PT); Franco Doro, Hilversum (NL)

(73) Assignee: INTERNATIONAL FLAVORS & FRAGRANCES INC., New York, NY (US)

( * ) Notice: Subject to any disclaimer, the term of this patent is extended or adjusted under 35 U.S.C. 154(b) by 0 days.

(21) Appl. No.: 17/338,798

(22) Filed: Jun. 4, 2021

(65) Prior Publication Data

US 2021/0380907 A1 Dec. 9, 2021

Related U.S. Application Data

(60) Provisional application No. 63/034,665, filed on Jun. 4, 2020.

(51) Int. Cl.

| | |
|---|---|
| ***C11D 3/50*** | (2006.01) |
| ***C11B 9/00*** | (2006.01) |
| ***C11D 3/00*** | (2006.01) |
| ***C11D 3/20*** | (2006.01) |
| ***C11D 3/43*** | (2006.01) |

(52) U.S. Cl.

CPC ................ *C11D 3/505* (2013.01); *C11B 9/00* (2013.01); *C11D 3/001* (2013.01); *C11D 3/2093* (2013.01); *C11D 3/43* (2013.01)

(58) Field of Classification Search

CPC ........ A61K 47/14; A61K 9/4858; A61K 8/37; C11D 3/505; C11D 3/50; C11D 3/502; C11D 7/5004; C11D 9/44; C11D 11/0017

See application file for complete search history.

(56) References Cited

U.S. PATENT DOCUMENTS

| | | | | |
|---|---|---|---|---|
| 6,030,948 | A * | 2/2000 | Mann | A61K 8/41 514/3.3 |
| 2003/0170190 | A1* | 9/2003 | Rosenberg Nevo | A61K 8/925 424/65 |
| 2015/0071976 | A1* | 3/2015 | Dihora | A61Q 13/00 424/401 |
| 2017/0258694 | A1* | 9/2017 | Fernandez-Prieto | C11D 17/047 |
| 2018/0008740 | A1* | 1/2018 | Morgan, III | A61L 9/01 |
| 2018/0064624 | A1* | 3/2018 | Sturgis | A61K 8/738 |
| 2021/0324299 | A1* | 10/2021 | Fraser | A61K 8/31 |

OTHER PUBLICATIONS

Extended European Search Report dated Nov. 2, 2021 for EP 21177714.9, filed Jun. 4, 2021.

* cited by examiner

*Primary Examiner* — Charles I Boyer

(57) ABSTRACT

A fragrance composition composed of a high-performance fragrance component and isopropyl myristate is provided. Use of isopropyl myristate as a solvent provides for an increase in the perceived fragrance intensity of a fabric care product, in particular under dry stage conditions.

6 Claims, 3 Drawing Sheets

| LEVEL | | | LEAST SQ MEAN |
|---|---|---|---|
| USC 2 ONLY | A | | 1.31 |
| 10% USC 2 + 90% IPM | A | B | 1.31 |
| 2.66% USC 2 + 97.33% IPM | A | B | 1.30 |
| 10% CONTROL + 90% IPM | A | B | 1.26 |
| 2.66% USC 1 + 97.33% IPM | A | B | 1.22 |
| USC 1 ONLY | A | B | 1.22 |
| CONTROL ONLY | A | B | 1.21 |
| 2.66% CONTROL + 97.33% IPM | A | B | 1.21 |
| 10% USC 1 + 90% IPM | | B | 1.14 |

| LEVEL | | LEAST SQ MEAN |
|---|---|---|
| 2.66% USC 1 + 97.33% IPM | A | 1.34 |
| USC 1 ONLY | A B | 1.29 |
| USC 2 ONLY | A B C | 1.25 |
| 2.66% USC 2 + 97.33% IPM | A B C | 1.22 |
| 10% USC 2 + 90% IPM | A B C | 1.21 |
| 10% CONTROL + 90% IPM | B C D | 1.17 |
| CONTROL ONLY | B C D | 1.15 |
| 2.66% CONTROL + 97.33% IPM | C D | 1.13 |
| 10% USC 1 + 90% IPM | D | 1.02 |

| LEVEL | | | | LEAST SQ MEAN |
|---|---|---|---|---|
| 2.66% USC 1 + 97.33% IPM | A | | | 1.23 |
| 2.66% USC 2 + 97.33% IPM | A | B | | 1.05 |
| 10% USC 2 + 90% IPM | | B | C | 0.98 |
| 2.66% CONTROL + 97.33% IPM | | B | C | 0.97 |
| USC 1 ONLY | | B | C | 0.95 |
| CONTROL ONLY | | B | C | 0.90 |
| USC 2 ONLY | | | C | 0.87 |
| 10% USC 1 + 90% IPM | | | C | 0.86 |
| 10% CONTROL + 90% IPM | | | C | 0.85 |

FABRIC CARE COMPOSITION AND METHOD FOR IMPROVING FRAGRANCE INTENSITY WITH ISOPROPYL MYRISTATE

BACKGROUND OF THE INVENTION

Solvents refers to a class of chemical compounds that are used in chemistry to dissolve, suspend or extract other materials, typically without chemically changing either the solvents themselves or the other chemicals. Solvents are generally in liquid form and can be used in a wide variety of everyday product applications, including paint, personal care products, pharmaceuticals, pesticides, cleaners and inks.

Solvents encompass a large and versatile number of different compounds that meet specific needs to make products with optimal performance attributes. In cleaning products solvents like glycol ethers are highly effective as an active component of heavy-duty glass, floor and other hard surface cleaning formulations. These solvents have good water compatibility, high solvency for greases and oils and good biodegradability. Isoparaffins are used to dry-clean clothes. These solvents are valued for their low odor, favorable health and environmental profile, safe handling characteristics and excellent cleaning efficiency.

In personal care products, many cosmetic products rely on solvents to dissolve ingredients and enable them to work properly. Solvents are used in lotions, powders and shaving creams to provide appropriate consistency for the product. In fine fragrance applications specific ratios of ethanol and water are used to dilute the fragrance oil. On one hand, these solvents soften the intensity and character of the fragrance compared to when it is smelled pure, while on the other hand they allow for smooth evaporation once in use. Ethanol is used by perfume manufacturers as their solvent of choice, primarily because of its low odor and low boiling point that allows for quick evaporation from the skin. Ethyl acetate or acetone is used in nail polish and is especially valued for its fast-drying properties. It is also used in nail polish removal fluids, and its high solvency power means that the polish can be removed easily from the nail.

SUMMARY OF THE INVENTION

This invention is a fragrance composition composed of a fragrance component, in an amount ≤10% by weight of the fragrance composition; and isopropyl myristate, in an amount ≥90% of the fragrance composition. In some aspects, the fragrance component includes at least 1% by weight of the fragrance component a fragrance selected from the group of Decahydro-2,2,6,6,7,8,8-heptamethyl indenofuran; Octahydro-4,7-methano-1H-indene-5-acetaldehyde; Cyclohexyl Salicylate; (4E)-4,8-dimethyldeca-4,9-dienal; 1-(5,5-Dimethyl-1-cyclohexenyl)pent-4-en-1-one; [1-Methyl-2-[(1,2,2-trimethylbicyclo[3.1.0]hex-3-yl) methyl]cyclopropyl]methanol; 2-Methoxyethylbenzene; 3-Methylcyclopentadecenone; 2-Cyclohexylidene-2-phenylacetonitrile; 4-Methyl-2-phenyl-3,6-dihydro-2H-pyran & 4-Methyl-6-phenyl-3,6-dihydro-2H-pyran & 4-Methylene-2-phenyltetrahydro-2H-pyran mixture; (±)-γ-Nonalactone; 1,2,3,4,4a,5,6,7-Octahydro-2,5,5-trimethyl-2-naphthalenol; 7-Methyl-2H-1,5-benzodioxepin-3(4H)-one; 4-(Heptyloxy)-3-methylbutanal; β-Damascenone, (2Z)-1-(2,6,6-Trimethyl-2-cyclohexen-1-yl)-2-buten-1-one; δ-Decalactone; 4-(octahydro-4,7-methano-5H-inden-5-ylidene) butanal; Ethyl salicylate; Hexadecanolide; trans-2-Hexen-1-ol; β-Apo-8-carotenal; 1-[(1R,6R)-2,2,6-Trimethylcyclohexyl]hexan-3-ol; 2-Hexyl-2-cyclopenten-1-one; Maltol; 5-Methylfurfural; 8-Methyl-1-oxaspiro[4.5]decan-2-one; 3-Methyl-5-cyclopentadecen-1-one; (2E,6Z)-1,1-Diethoxy-2,6-nonadiene; γ-Octalactone; 3a,5,6,7,8,8b-Hexahydro-2,2,6,6,7,8,8-heptamethyl-4H-indeno[4,5-d]-1,3-dioxole; Phenylacetaldehyde; 6,6-Dimethyl-2-norpinene-2-propionaldehyde; (−)-cis-Rose oxide, rose oxide; 1-(Ethoxymethyl)-2-methoxybenzene; 2,6,6-trimethylcyclohexa-1,3-diene-1-carbaldehyde; dimethyl-10-methylene-2,6,11-dodecatrienal; N-(5-methylheptan-3-ylidene)hydroxylamine; 3-Ethylhexahydro-2(3H)-benzofuranone; γ-Valerolactone; and 2-Methoxynaphthalene. In other aspects, the weight ratio of the fragrance component to isopropyl myristate is in the range of about 10:90 to about 1:99. A fabric care product including the fragrance composition, e.g., in an amount of less than about 1% by weight of the fabric care product, is also provided. Such fabric care products include, e.g., a scent booster, fabric detergent, fabric conditioner, rinse conditioner, fabric liquid conditioner, tumble drier sheet, fabric refresher, fabric refresher spray, ironing liquid, or fabric softener system.

This invention also provides a method for enhancing the perceived intensity of a fragrance by mixing a fragrance component with isopropyl myristate to form a fragrance composition, wherein the fragrance composition has an enhanced perceived intensity compared to a control composition, e.g., at a dry stage, and wherein the control composition is composed of the same contents by identity and quantity as the fragrance composition but without the isopropyl myristate. In one aspect, the fragrance component is present in an amount ≤10% by weight of the fragrance composition; and the isopropyl myristate is present in an amount ≥90% of the fragrance composition. In another aspect, the fragrance component includes at least 1% by weight of the fragrance component a fragrance selected from the group consisting of Decahydro-2,2,6,6,7,8,8-heptamethyl indenofuran; Octahydro-4,7-methano-1H-indene-5-acetaldehyde; Cyclohexyl Salicylate; Floral super; Galbascone; [1-Methyl-2-[(1,2,2-trimethylbicyclo[3.1.0]hex-3-yl) methyl]cyclopropyl]methanol; Methyl Phenethyl Ether; Muscemor, Peonile; and Rosyrane Super. In a further aspect, the weight ratio of the fragrance component to isopropyl myristate is in the range of about 10:90 to about 1:99.

The elements of the composition of the invention described in relation to the first aspect of the invention apply mutatis mutandis to the other aspects of the invention.

These and other features of the present invention will become apparent to one skilled in the art upon review of the following detailed description when taken in conjunction with the appended claims.

BRIEF DESCRIPTION OF THE DRAWINGS

While the specification concludes with claims particularly pointing out and distinctly claiming the invention, it is believed that the invention will be better understood from the following description of the accompanying figures wherein:

DETAILED DESCRIPTION OF THE INVENTION

Figure 1A:
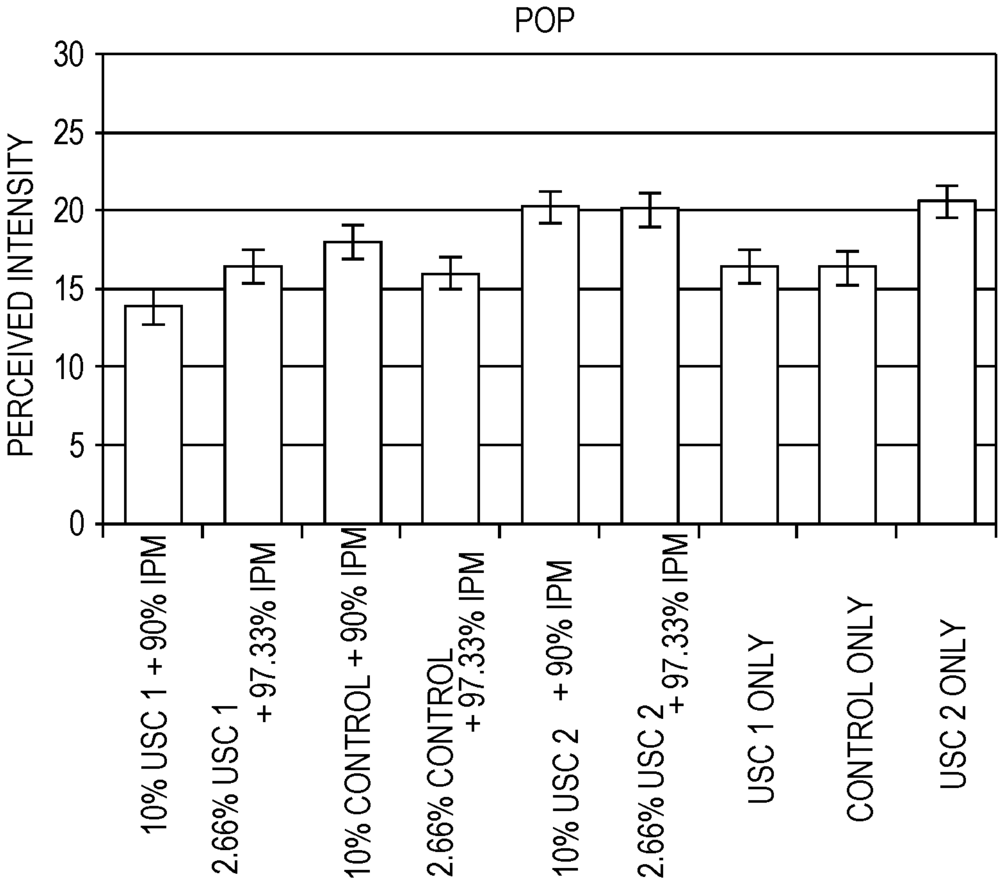
FIG. 1A-1C respectively show the perceived intensity of fragrance formulations at Point of Purchase ("POP"), damp and dry stages as determined by a sensory panel using the Label Magnitude Scale (LMS) from 0 to 99. Connecting letters reports are provided in the Tables. Levels that share, or are connected by, the same letter do not differ statistically. Levels that are not connected by a common letter do differ statistically.

It is common practice to use a variety of chemical solvents in perfumery, particularly for improving the chemical stability of the overall product formulation. It has now been surprisingly found that the combination of a high performance fragrance with a specific amount or ratio of isopropyl myristate (IPM) as solvent provides a synergistic improvement in the overall perceived fragrance performance or intensity of a fragrance composition in a fabric care product at a dry fabric care stage as compared to a control composition. This finding is counterintuitive given that higher dilutions of a high-performance fragrance composition in IPM provides an increase in the perceived fragrance intensity at dry stage. Such a synergistic effect is not observed with benchmark fragrances. Accordingly, this invention provides the advantage that less product and/or less fragrance in a consumer product can be used while still achieving the same fragrance intensity as compared to a benchmark/traditional fragrance formula.

This invention is therefore a fragrance composition composed of a high-performance fragrance diluted in IPM and use of the same in a fabric care product for providing decreased fragrance levels and enhanced perceived fragrance intensity, in particular at a dry stage. For the purposes of the present invention, the terms "fragrance composition," "fragrance formulation," and "perfume composition" mean the same and refer to a composition that is a mixture of fragrance ingredients including, for example, alcohols, aldehydes, ketones, esters, ethers, lactones, nitriles, natural oils, synthetic oils, and mercaptans, which are admixed so that the combined odors of the individual ingredients produce a pleasant or desired fragrance. In particular aspects, the fragrance composition of this invention comprises, consists essentially of or consists of a fragrance component and isopropyl myristate (CAS No. 110-27-0). In certain aspects, the fragrance component is composed of one or a combination of fragrances, wherein at least one of said fragrances is selected from a fragrance listed in Table 1.

TABLE 1

| Fragrance | Chemical Name | CAS No. |
|---|---|---|
| Amber Xtreme ™ | Decahydro-2,2,6,6,7,8,8-heptamethyl indenofuran | 476332-65-7 |
| Aquaflora ™ | Octahydro-4,7-methano-1H-indene-5-acetaldehyde | 1339119-15-1 1338815-87-4 |
| Cyclohexyl Salicylate | Cyclohexyl 2-hydroxybenzoate | 25485-88-5 |
| Floral super | (4E)-4,8-dimethyldeca-4,9-dienal | 71077-31-1 |
| Galbascone alpha 95 PRG | 1-(5,5-Dimethyl-1-cyclohexenyl)pent-4-en-1-one | 56973-85-4 |
| JAVANOL ® TT | [1-Methyl-2-1[(1,2,2-trimethylbicyclo[3.1.0]hex-3-yl)methyl]cyclopropyl]methanol | 198404-98-7 |
| Methyl Phenethyl Ether | 2-Methoxyethylbenzene | 3558-60-9 |
| Muscemor | 3-Methylcyclopentadecenone | 63314-79-4 |
| Peonile | 2-Cyclohexylidene-2-phenylacetonitrile phenylacetonitrile | 10461-98-0 |
| Rosyrane Super | 4-Methyl-2-phenyl-3,6-dihydro-2H-pyran & 4-Methyl-6-phenyl-3,6-dihydro-2H-pyran & 4-Methylene-2-phenyltetrahydro-2H-pyran mixture | 60335-71-9 |
| ALD C-18 | (±)-γ-Nonalactone | 104-61-0 |
| AMBRINOL 95 PRG | 1,2,3,4,4a,5,6,7-Octahydro-2,5,5-trimethyl-2-naphthalenol | 41199-19-3 |
| CALONE ® | 7-Methyl-2H-1,5-benzodioxepin-3(4H)-one | 28940-11-6 |
| CRISTALFIZZ | 4-(Heptyloxy)-3-methylbutanal | 1093653-57-6 |
| DAMASCENONE TOTAL | β-Damascenone, (2Z)-1-(2,6,6-Trimethyl-2-cyclohexen-1-yl)-2-buten-1-one | 23726-93-4, 23726-94-5 |
| DECALACTONE, DELTA | δ-Decalactone | 705-86-2 |
| DUPICAL TOCO | 4-(octahydro-4,7-methano-5H-inden-5-ylidene)butanal | 30168-23-1 |
| ETH SAL | Ethyl salicylate | 118-61-6 |
| HEXADECANOLIDE | Hexadecanolide | 109-29-5 |
| HEXENOL, TRANS 2, | trans-2-Hexen-1-ol | 928-95-0 |
| HOMO CYCLOCITRAL, BETA | β-Apo-8-carotenal | 472-66-2 |
| HYSANDOL | 1-[(1R,6R)-2,2,6-Trimethylcyclohexyl]hexan-3-ol | 923591-63-3 |
| ISO JASMONE PURE BHT | 2-Hexyl-2-cyclopenten-1-one | 95-41-0 |
| MALTOL (PALATONE) | Maltol | 118-71-8 |
| METH FURFURAL, 5, | 5-Methylfurfural | 620-02-0 |
| METH LAITONE 10 PCT DPG | 8-Methyl-1-oxaspiro[4.5]decan-2-one | 94201-19-1 |
| NONADIENAL 2-6 DIETH ACETAL 1% DPG | (2E,6Z)-1,1-Diethoxy-2,6-nonadiene | 67674-36-6 |
| OCTALACTONE GAMMA | γ-Octalactone | 104-50-7 |
| OPERANIDE (ELINCS) | 3a,5,6,7,8,8b-Hexahydro-2,2,6,6,7,8,8-heptamethyl-4H-indeno[4,5-d]-1,3-dioxole | 823178-41-2 |

TABLE 1-continued

| Fragrance | Chemical Name | CAS No. |
|---|---|---|
| PHEN ACETALD (MXDEA) | Phenylacetaldehyde | 122-78-1 |
| PINO ACETALD TOCO | 6,6-Dimethyl-2-norpinene-2-propionaldehyde | 33885-51-7 |
| ROSE OXIDE PRG TOCO | (-)-cis-Rose oxide, rose oxide | 3033-23-6/16409-43-1 |
| ROSETHYL | 1-(Ethoxymethyl)-2-methoxybenzene | 64988-06-3 |
| SAFRANAL TOCO 10% DPG | 2,6,6-trimethylcyclohexa-1,3-diene-1-carbaldehyde | 116-26-7 |
| SINENSAL NATURAL 20 EX ORANGE | 2-dimethyl-10-methylene-2,6,11-dodecatrienal | 60066-88-8/8028-48-6 |
| STEMONE ® | N-(5-methylheptan-3-ylidene)hydroxylamine | 22457-23-4 |
| TONKALACTONE | 3-Ethylhexahydro-2(3H)-benzofuranone | 54491-17-7 |
| VALEROLACTONE, GAMMA | γ-Valerolactone | 108-29-2 |
| YARA YARA EXTRA PRG | 2-Methoxynaphthalene | 93-04-9 |

In particular aspects, a fragrance listed in Table 1 is included in the fragrance component in an amount of at least 1% by weight of the fragrance component. More specifically, a fragrance listed in Table 1 is included in the fragrance component in an amount in the range of 1% to 100% by weight of the fragrance component. In particular, a fragrance listed in Table 1 is included in the fragrance component in an amount of about 1%, 2%, 5%, 10%, 20%, 30%, 40%, 50%, 60%, 70%, 80%, 90% or 100% by weight of the fragrance component. A fragrance of Table 1 may also be present within any range delimited by any pair of the foregoing values, such as between 1% and 50%, between 2% and 20% or between 1% and 20%, for example. As used herein, the term "about" is intended to refer to an amount ±0.01% to 0.5% of the amount specified.

In addition to the fragrances listed in Table 1, the fragrance component may include 1, 2, 3, 4, 5, 6, 7, 8, 9 or more fragrances. Such additional fragrances that can be used in the fragrance component of this invention include, but are not limited to:

i) hydrocarbons, such as, for example, 3-carene, α-pinene, β-pinene, α-terpinene, γ-terpinene, p-cymene, bisabolene, camphene, caryophyllene, cedrene, farnesene, limonene, longifolene, myrcene, ocimene, valencene, (E,Z)-1,3,5-undecatriene, styrene, and diphenylmethane;

ii) aliphatic alcohols, such as, for example, hexanol, octanol, 3-octanol, 2,6-dimethylheptanol, 2-methyl-2-heptanol, 2-methyl-2-octanol, (E)-2-hexenol, (E)- and (Z)-3-hexenol, 1-octen-3-ol, a mixture of 3,4,5,6,6-pentamethyl-3/4-hepten-2-ol and 3,5,6,6-tetramethyl-4-methyleneheptan-2-ol, (E,Z)-2,6-nonadienol, 3,7-dimethyl-7-methoxyoctan-2-ol, 9-decenol, 10-undecenol, 4-methyl-3-decen-5-ol, aliphatic aldehydes and their acetals such as for example hexanal, heptanal, octanal, nonanal, decanal, undecanal, dodecanal, tridecanal, 2-methyloctanal, 2-methylnonanal, (E)-2-hexenal, (Z)-4-heptenal, 2,6-dimethyl-5-heptenal, 10-undecenal, (E)-4-decenal, 2-dodecenal, 2,6,10-trimethyl-5,9-undecadienal, heptanal-diethylacetal, 1,1-dimethoxy-2,2,5-trimethyl-4-hexene, and citronellyl oxyacetaldehyde;

iii) aliphatic ketones and oximes thereof, such as, for example, 2-heptanone, 2-octanone, 3-octanone, 2-nonanone, 5-methyl-3-heptanone, 5-methyl-3-heptanone oxime, 2,4,4,7-tetramethyl-6-octen-3-one, aliphatic sulfur-containing compounds, such as for example 3-methylthiohexanol, 3-methylthiohexyl acetate, 3-mercaptohexanol, 3-mercaptohexyl acetate, 3-mercaptohexyl butyrate, 3-acetylthiohexyl acetate, 1-menthene-8-thiol, and aliphatic nitriles (e.g., 2-nonenenitrile, 2-tridecenenitrile, 2,12-tridecenenitrile, 3,7-dimethyl-2,6-octadienenitrile, and 3,7-dimethyl-6-octenenitrile);

iv) aliphatic carboxylic acids and esters thereof, such as, for example, (E)- and (Z)-3-hexenylformate, ethyl acetoacetate, isoamyl acetate, hexyl acetate, 3,5,5-trimethylhexyl acetate, 3-methyl-2-butenyl acetate, (E)-2-hexenyl acetate, (E)- and (Z)-3-hexenyl acetate, octyl acetate, 3-octyl acetate, 1-octen-3-yl acetate, ethyl butyrate, butyl butyrate, isoamyl butyrate, hexylbutyrate, (E)- and (Z)-3-hexenyl isobutyrate, hexyl crotonate, ethylisovalerate, ethyl-2-methyl pentanoate, ethyl hexanoate, allyl hexanoate, ethyl heptanoate, allyl heptanoate, ethyl octanoate, ethyl-(E,Z)-2,4-decadienoate, methyl-2-octinate, methyl-2-noninate, allyl-2-isoamyl oxyacetate, and methyl-3,7-dimethyl-2,6-octadienoate;

v) acyclic terpene alcohols, such as, for example, citronellol; geraniol; nerol; linalool; lavandulol; nerolidol; farnesol; tetrahydrolinalool; tetrahydrogeraniol; 2,6-dimethyl-7-octen-2-ol; 2,6-dimethyloctan-2-ol; 2-methyl-6-methylene-7-octen-2-ol; 2,6-dimethyl-5,7-octadien-2-ol; 2,6-dimethyl-3,5-octadien-2-ol; 3,7-dimethyl-4,6-octadien-3-ol; 3,7-dimethyl-1,5,7-octatrien-3-ol 2,6-dimethyl-2,5,7-octatrien-1-ol; as well as formates, acetates, propionates, isobutyrates, butyrates, isovalerates, pentanoates, hexanoates, crotonates, tiglinates and 3-methyl-2-butenoates thereof;

vi) acyclic terpene aldehydes and ketones, such as, for example, geranial, neral, citronellal, 7-hydroxy-3,7-dimethyloctanal, 7-methoxy-3,7-dimethyloctanal, 2,6,10-trimethyl-9-undecenal, α-sinensal, β-sinensal, geranylacetone, as well as the dimethyl- and diethylacetals of geranial, neral and 7-hydroxy-3,7-dimethyloctanal;

vii) cyclic terpene alcohols, such as, for example, menthol, isopulegol, alpha-terpineol, terpinen-4-ol, menthan-8-ol, menthan-1-ol, menthan-7-ol, borneol, isoborneol, linalool oxide, nopol, cedrol, ambrinol, vetiverol, guaiol, and the formates, acetates, propionates, isobutyrates, butyrates, isovalerates, pentanoates, hexanoates, crotonates, tiglinates and 3-methyl-2-butenoates of alpha-terpineol, terpinen-4-ol, methan-8-ol, methan-1-ol, methan-7-ol, borneol, isoborneol, linalool oxide, nopol, cedrol, ambrinol, vetiverol, and guaiol;

viii) cyclic terpene aldehydes and ketones, such as, for example, menthone, isomenthone, 8-mercaptomenthan-3-one, carvone, camphor, fenchone, α-ionone, β-ionone, α-n-methylionone, β-n-methylionone, α-isomethylionone, β-isomethylionone, alpha-irone, α-damascone, β-damascone, β-damascenone, δ-damascone, γ-damascone, 1-(2,4,4-trimethyl-2-cyclohexen-1-yl)-2-buten-1-one, 1,3,4,6,7,8a-hexahydro-1,1,5,5-tetramethyl-2H-2,4a-methanonaphthalen-8 (5H-)-one, nootkatone, dihydronootkatone; acetylated cedarwood oil (cedryl methyl ketone);

ix) cyclic alcohols, such as, for example, 4-tert-butylcyclohexanol, 3,3,5-trimethylcyclohexanol, 3-isocamphylcyclohexanol, 2,6,9-trimethyl-Z2,Z5,E9-cyclododecatrien-1-ol, 2-isobutyl-4-methyltetrahydro-2H-pyran-4-ol;

x) cycloaliphatic alcohols, such as, for example, alpha, 3,3-trimethylcyclo-hexylmethanol, 2-methyl-4-(2,2,3-trimethyl-3-cyclopent-1-yl)butanol, 2-methyl-4-(2,2,3-trimethyl-3-cyclopent-1-yl)-2-buten-1-ol, 2-ethyl-4-(2,2,3-trimethyl-3-cyclopent-1-yl)-2-buten-1-ol, 3-methyl-5-(2,2,3-trimethyl-3-cyclopent-1-yl)-pentan-2-ol, 3-methyl-5-(2,2,3-trimethyl-3-cyclopent-1-yl)-4-penten-2-ol, 3,3-dimethyl-5-(2,2,3-trimethyl-3-cyclopent-1-yl)-4-penten-2-ol, 1-(2,2,6-trimethylcyclohexyl)pentan-3-ol, 1-(2,2,6-trimethylcyclohexyl)hexan-3-ol;

xi) cyclic and cycloaliphatic ethers, such as, for example, cineole, cedryl methyl ether, cyclododecyl methyl ether;

xii) (ethoxymethoxy)cyclododecane; alpha-cedrene epoxide, 3a,6,6,9a-tetramethyldodecahydronaphtho[2,1-b] furan, 3a-ethyl-6,6,9a-trimethyldodecahydronaphtho [2,1-b]furan, 1,5,9-trimethyl-13-oxabicyclo[10.1.0]-trideca-4,8-diene, rose oxide, 2-(2,4-dimethyl-3-cyclohexen-1-yl)-5-methyl-5-(1-methylpropyl)-1,3-dioxan-;

xiii) cyclic ketones, such as, for example, 4-tert-butylcyclohexanone, 2,2,5-trimethyl-5-pentylcyclopentanone, 2-heptylcyclopentanone, 2-pentylcyclopentanone, 2-hydroxy-3-methyl-2-cyclopenten-1-one, 3-methyl-cis-2-penten-1-yl-2-cyclopenten-1-one, 3-methyl-2-pentyl-2-cyclopenten-1-one, 3-methyl-4-cyclopentadecenone, 3-methyl-5-cyclopentadecenone, 3-methylcyclopentadecanone, 4-(1-ethoxyvinyl)-3,3,5,5-tetramethylcyclohexanone, 4-tert-pentylcyclohexanone, 5-cyclohexadecen-1-one, 6,7-dihydro-1,1,2,3,3-pentamethyl-4(5H)-indanone, 5-cyclohexadecen-1-one, 8-cyclohexadecen-1-one, 9-cycloheptadecen-1-one, cyclopentadecanone, cycloaliphatic aldehydes, such as, for example, 2,4-dimethyl-3-cyclohexene carbaldehyde, 2-methyl-4-(2,2,6-trimethyl-cyclohexen-1-yl)-2-butenal, 4-(4-hydroxy-4-methylpentyl)-3-cyclohexene carbaldehyde, 4-(4-methyl-3-penten-1-yl)-3-cyclohexene carbaldehyde;

xiv) cycloaliphatic ketones, such as, for example, 1-(3,3-dimethylcyclohexyl)-4-penten-1-one, 1-(5,5-dimethyl-1-cyclohexen-1-yl)-4-penten-1-one, 2,3,8,8-tetramethyl-1,2,3,4,5,6,7,8-octahydro-2-naphtalenyl methylketone, methyl-2,6,10-trimethyl-2,5,9-cyclododecatrienyl ketone, tert-butyl-(2,4-dimethyl-3-cyclohexen-1-yl)ketone;

xv) esters of cyclic alcohols, such as, for example, 2-tert-butylcyclohexyl acetate, 4-tert-butylcyclohexyl acetate, 2-tert-pentylcyclohexyl acetate, 4-tert-pentylcyclohexyl acetate, decahydro-2-naphthyl acetate, 3-pentyltetrahydro-2H-pyran-4-yl acetate, decahydro-2,5,5,8a-tetramethyl-2-naphthyl acetate, 4,7-methano-3a,4,5,6,7,7a-hexahydro-5 or 6-indenyl acetate, 4,7-methano-3a,4,5,6,7,7a-hexahydro-5 or 6-indenyl propionate, 4,7-methano-3a,4,5,6,7,7a-hexahydro-5 or 6-indenyl-isobutyrate, 4,7-methanooctahydro-5 or 6-indenyl acetate;

xvi) esters of cycloaliphatic carboxylic acids, such as, for example, allyl 3-cyclohexyl-propionate, allyl cyclohexyl oxyacetate, methyl dihydrojasmonate, methyl jasmonate, methyl 2-hexyl-3-oxocyclopentanecarboxylate, ethyl 2-ethyl-6,6-dimethyl-2-cyclohexenecarboxylate, ethyl 2,3,6,6-tetramethyl-2-cyclohexenecarboxylate, ethyl 2-methyl-1,3-dioxolane-2-acetate;

xvii) aromatic and aliphatic alcohols, such as, for example, benzyl alcohol, 1-phenylethyl alcohol, 2-phenylethyl alcohol, 3-phenylpropanol, 2-phenylpropanol, 2-phenoxyethanol, 2,2-dimethyl-3-phenylpropanol, 2,2-dimethyl-3-(3-methylphenyl)propanol, 1,1-dimethyl-2-phenylethyl alcohol, 1,1-dimethyl-3-phenylpropanol, 1-ethyl-1-methyl-3-phenylpropanol, 2-methyl-5-phenylpentanol, 3-methyl-5-phenylpentanol, 3-phenyl-2-propen-1-ol, 4-methoxybenzyl alcohol, 1-(4-isopropylphenyl)ethanol;

xviii) esters of aliphatic alcohols and aliphatic carboxylic acids, such as, for example, benzyl acetate, benzyl propionate, benzyl isobutyrate, benzyl isovalerate, 2-phenylethyl acetate, 2-phenylethyl propionate, 2-phenylethyl isobutyrate, 2-phenylethyl isovalerate, 1-phenylethyl acetate, α-trichloromethylbenzyl acetate, α,α-dimethylphenylethyl acetate, alpha, alpha-dimethylphenylethyl butyrate, cinnamyl acetate, 2-phenoxyethyl isobutyrate, 4-methoxybenzyl acetate, araliphatic ethers, such as for example 2-phenylethyl methyl ether, 2-phenylethyl isoamyl ether, 2-phenylethyl-1-ethoxyethyl ether, phenylacetaldehyde dimethyl acetal, phenylacetaldehyde diethyl acetal, hydratropaaldehyde dimethyl acetal, phenylacetaldehyde glycerol acetal, 2,4,6-trimethyl-4-phenyl-1,3-dioxane, 4,4a,5,9b-tetrahydroindeno[1,2-d]-m-dioxin, 4,4a,5,9b-tetrahydro-2,4-dimethylindeno[1,2-d]-m-dioxin;

xix) aromatic and aliphatic aldehydes, such as, for example, benzaldehyde; phenylacetaldehyde, 3-phenylpropanal, hydratropaldehyde, 4-methylbenzaldehyde, 4-methylphenylacetaldehyde, 3-(4-ethylphenyl)-2,2-dimethylpropanal, 2-methyl-3-(4-isopropylphenyl) propanal, 2-methyl-3-(4-tert-butylphenyl)propanal, 3-(4-tert-butylphenyl)propanal, cinnamaldehyde, alpha-butylcinnamaldehyde, alpha-amylcinnamaldehyde, alpha-hexylcinnamaldehyde, 3-methyl-5-phenylpentanal, 4-methoxybenzaldehyde, 4-hydroxy-3-methoxybenzaldehyde, 4-hydroxy-3-ethoxybenzaldehyde, 3,4-methylene-dioxybenzaldehyde, 3,4-dimethoxybenzaldehyde, 2-methyl-3-(4-methoxyphenyl) propanal, 2-methyl-3-(4-methylendioxyphenyl)propanal;

xx) aromatic and aliphatic ketones, such as, for example, acetophenone, 4-methylacetophenone, 4-methoxyacetophenone, 4-tert-butyl-2,6-dimethylacetophenone, 4-phenyl-2-butanone, 4-(4-hydroxyphenyl)-2-butanone, 1-(2-naphthalenyl)ethanone, benzophenone, 1,1,2,3,3,6-hexamethyl-5-indanyl methyl ketone, 6-tert-butyl-1,1-dimethyl-4-indanyl methyl ketone, 1-[2,3-dihydro-1,1,2,6-tetramethyl-3-(1-methyl-ethyl)-1H-5-indenyl]ethanone, 5',6',7',8'-tetrahydro-3',5',5',6',8',8'-hexamethyl-2-acetonaphthone;

xxi) aromatic and araliphatic carboxylic acids and esters thereof, such as, for example, benzoic acid, phenylacetic acid, methyl benzoate, ethyl benzoate, hexyl benzoate, benzyl benzoate, methyl phenylacetate, ethyl phenylacetate, geranyl phenylacetate, phenylethyl phenylacetate, methyl cinnamate, ethyl cinnamate, benzyl cinnamate, phenylethyl cinnamate, cinnamyl cinnamate, allyl phenoxyacetate, methyl salicylate, isoamyl salicylate, hexyl salicylate, cyclohexyl salicylate, cis-3-hexenyl salicylate, benzyl salicylate, phenylethyl salicylate, methyl 2,4-dihydroxy-3,6-dimethylbenzoate, ethyl 3-phenylglycidate, ethyl 3-methyl-3-phenylglycidate;

xxii) nitrogen-containing aromatic compounds, such as, for example, 2,4,6-trinitro-1,3-dimethyl-5-tert-butylbenzene, 3,5-dinitro-2,6-dimethyl-4-tert-butylacetophenone, cinnamonitrile, 5-phenyl-3-methyl-2-pentenonitrile, 5-phenyl-3-methylpentanonitrile, methyl anthranilate, methyl-N-methylanthranilate, Schiff's bases of methyl anthranilate with 7-hydroxy-3,7-dimethyloctanal, 2-methyl-3-(4-tert-butylphenyl)propanal or 2,4-dimethyl-3-cyclohexene carbaldehyde, 6-isopropylquinoline, 6-isobutylquinoline, 6-sec-butylquinoline, indole, skatole, 2-methoxy-3-isopropylpyrazine, 2-isobutyl-3-methoxypyrazine;

xxiii) phenols, phenyl ethers and phenyl esters, such as, for example, estragole, anethole, eugenol, eugenyl methyl ether, isoeugenol, isoeugenol methyl ether, thymol, carvacrol, diphenyl ether, beta-naphthyl methyl ether, beta-naphthyl ethyl ether, beta-naphthyl isobutyl ether, 1,4-dimethoxybenzene, eugenyl acetate, 2-methoxy-4-methylphenol, 2-ethoxy-5-(1-propenyl) phenol, p-cresyl phenylacetate;

xxiv) heterocyclic compounds, such as, for example, 2,5-dimethyl-4-hydroxy-2H-furan-3-one, 2-ethyl-4-hydroxy-5-methyl-2H-furan-3-one, 3-hydroxy-2-methyl-4H-pyran-4-one, 2-ethyl-3-hydroxy-4H-pyran-4-one;

xxv) lactones, such as, for example, 1,4-octanolide, 3-methyl-1,4-octanolide, 1,4-nonanolide, 1,4-decanolide, 8-decen-1,4-olide, 1,4-undecanolide, 1,4-dodecanolide, 1,5-decanolide, 1,5-dodecanolide, 1,15-pentadecanolide, cis- and trans-11-pentadecen-1,15-olide, cis- and trans-12-pentadecen-1,15-olide, 1,16-hexadecanolide, 9-hexadecen-1,16-olide, 10-oxa-1,16-hexadecanolide, 11-oxa-1,16-hexadecanolide, 12-oxa-1,16-hexadecanolide, ethylene-1,12-dodecanedioate, ethylene-1,13-tridecanedioate, coumarin, 2,3-dihydrocoumarin, and octahydrocoumarin; and xxvi) essential oils, concretes, absolutes, resins, resinoids, balsams, tinctures such as for example ambergris tincture, amyris oil, angelica seed oil, angelica root oil, aniseed oil, valerian oil, basil oil, tree moss absolute, bay oil, armoise oil, benzoe resinoid, bergamot oil, beeswax absolute, birch tar oil, bitter almond oil, savory oil, buchu leaf oil, cabreuva oil, cade oil, calamus oil, camphor oil, cananga oil, cardamom oil, cascarilla oil, cassia oil, cassie absolute, castoreum absolute, cedar leaf oil, cedar wood oil, cistus oil, citronella oil, lemon oil, copaiba balsam, copaiba balsam oil, coriander oil, costus root oil, cumin oil, cypress oil, davana oil, dill weed oil, dill seed oil, eau de brouts absolute, oakmoss absolute, elemi oil, estragon oil, eucalyptus citriodora oil, eucalyptus oil (cineole type), fennel oil, fir needle oil, galbanum oil, galbanum resin, geranium oil, grapefruit oil, guaiacwood oil, gurjun balsam, gurjun balsam oil, helichrysum absolute, helichrysum oil, ginger oil, iris root absolute, iris root oil, jasmine absolute, calamus oil, blue chamomile oil, Roman chamomile oil, carrot seed oil, cascarilla oil, pine needle oil, spearmint oil, caraway oil, labdanum oil, labdanum absolute, labdanum resin, lavandin absolute, lavandin oil, lavender absolute, lavender oil, lemon-grass oil, lovage oil, lime oil distilled, lime oil expressed, linaloe oil, *Litsea cubeba* oil, laurel leaf oil, mace oil, marjoram oil, mandarin oil, massoi (bark) oil, mimosa absolute, ambrette seed oil, musk tincture, clary sage oil, nutmeg oil, myrrh absolute, myrrh oil, myrtle oil, clove leaf oil, clove bud oil, neroli oil, olibanum absolute, olibanum oil, opopanax oil, orange flower absolute, orange oil, origanum oil, palmarosa oil, patchouli oil, perilla oil, Peru balsam oil, parsley leaf oil, parsley seed oil, petitgrain oil, peppermint oil, pepper oil, pimento oil, pine oil, pennyroyal oil, rose absolute, rosewood oil, rose oil, rosemary oil, Dalmatian sage oil, Spanish sage oil, sandal-wood oil, celery seed oil: spike-lavender oil, star anise oil, storax oil, tagetes oil, fir needle oil, tea tree oil, turpentine oil, thyme oil, Tolu balsam, tonka bean absolute, tuberose absolute, vanilla extract, violet leaf absolute, verbena oil, vetiver oil, juniper berry oil, wine lees oil, wormwood oil, wintergreen oil, ylang-ylang oil, hyssop oil, civet absolute, cinnamon leaf oil, cinnamon bark oil, and fractions thereof or ingredients isolated therefrom.

The additional fragrances, when combined with one or more fragrances of Table 1, constitute the fragrance component. In this respect, the balance of the 100% by weight of the fragrance component is made up of one or more fragrances of Table 1 and optionally one or more additional fragrances. By way of illustration, an exemplary fragrance component is composed of 20% Muscemor (i.e., a fragrance from Table 1) and 10% Aldehyde C-12 MNA Toco, 20% Ambermor Ex, 20% Cashmeran® (1,2,3,5,6,7-Hexahydro-1,1,2,3,3-pentamethyl-4H-inden-4-one), 5% Pino Acetaldehyde Toco, 20% Rosethyl (ortho-(ethoxymethyl)anisole) and 5% Yara Yara Extra PRG as additional fragrances.

Unexpectedly, diluting a fragrance component of Table 1 with IPM results in an increase in perceived intensity of the fragrance component. In this respect, IPM synergizes with the fragrance component so that less of the fragrance component is required to achieve an intensity level equal to or greater to the intensity level of the fragrance component in the absence of IPM, in particular under dry conditions. Accordingly, in some aspects, the fragrance component is diluted in a synergistic amount of IPM, as long as synergism is achieved, i.e., as long as the perceived intensity of the fragrance composition is higher than the perceived intensity prior to dilution. In a preferred aspect of the invention, the fragrance component is less than or equal to about 10% by weight of the fragrance composition and IPM is greater than or equal to about 90% by weight of the fragrance composition. In some embodiments, the fragrance component is about 10%, 9%, 8%, 7%, 6%, 5%, 4%, 3%, 2% or 1% by weight of the fragrance composition. The fragrance component may further be present within any range delimited by any pair of the foregoing values, such as between 1% and 10%, between 2% and 10% or between 2% and 9%, for example. In other embodiments, IPM is about 90%, 91%, 92%, 93%, 94%, 95%, 96%, 97%, 98% or 99% by weight of the fragrance composition. The IPM may also be present within any range delimited by any pair of the foregoing values, such as between 90% and 99%, between 90% and 98% or between 92% and 98%, for example.

In other aspects, the weight ratio of the fragrance component to IPM is chosen to obtain synergistic fragrance composition. In some aspect, IPM is in excess of the fragrance component. Generally, the weight ratio of the fragrance component to IPM is in the range of about 10:90 to about 1:99, preferably about 10:90 to about 2:98.

The fragrance composition of this invention is of particular use in fabric care products as it can be used as at a reduced amount compared to conventional fragrance compositions. Therefore, this invention also provides a fabric care product, which includes a fragrance composition composed of a fragrance component and IPM. Ideally, the fabric care product further includes a fabric care active. Fabric care products include, but are not limited to scent booster, fabric detergent, fabric conditioner, rinse conditioner, fabric liquid conditioner, tumble drier sheet, fabric refresher, fabric refresher spray, ironing liquid, and fabric softener system. Scent boosters include those described in US 2007/0269651 A1 and US 2014/0107010 A1. Fabric Care Products such as Rinse Conditioners, Fabric Liquid Conditioners, Tumble Drier Sheets, Fabric Refreshers, Fabric Refresher Sprays, Ironing Liquids, and Fabric Softener Systems are described in U.S. Pat. Nos. 6,335,315, 5,674,832, 5,759,990, 5,877,145, 5,574,179, 5,562,849, 5,545,350, 5,545,340, 5,411,671, 5,403,499, 5,288,417, 4,767,547 and 4,424,134. Fabric care products may include, as fabric care active, a surfactant, bleach, enzyme, chelator, brightener, fabric softening agent and the like.

The fabric softeners/freshners contain at least one fabric softening agent presently, preferably at a concentration of 1% to 30% (eg., 4% to 20%, 4% to 10% or 8% top 15%). The ratio between ratio between the active material and the fabric softening agent can be 1:500 to 1:2 (eg., 1:250 to 1:4 and 1:100 to 1:8). As an illustration, when the fabric softening agent is 5% by weight of the fabric softener, the active material is 0.01 to 2.5%, preferably 0.02 to 1.25% and more preferably 0.1 to 0.63%. As another example, when the fabric softening agent is 20% by weight of the fabric softener, the active material is 0.04 to 10%, preferably 0.08 to 5% and more preferably 0.4 to 2.5%. The active material is a fragrance, malodor counteractant or mixture thereof. The liquid fabric softener can have 0.15 to 15% of capsules (eg., 0.5 to 10%, 0.7 to 5%, and 1 to 3%). When including capsules at these levels, the neat oil equivalent (NOE) in the softener is 0.05 to 5% (e.g., 0.15 to 3.2%, 0.25 to 2%, and 0.3 to 1%).

Suitable fabric softening agents include cationic surfactants. Non-limiting examples are quaternary ammonium compounds (QAC) such as alkylated quaternary ammonium compounds, ring or cyclic quaternary ammonium compounds, aromatic quaternary ammonium compounds, diquaternary ammonium compounds, alkoxylated quaternary ammonium compounds, amidoamine quaternary ammonium compounds, ester quaternary ammonium compounds, and mixtures thereof. Fabric softening compositions, and components thereof, are generally described in US 2004/0204337 and US 2003/0060390. Suitable softening agents include esterquats such as Rewoquat WE 18 commercially available from Evonik Industries and Stepantex SP-90 commercially available from Stepan Company.

In certain embodiments, the fabric softening product comprises an aqueous dispersion of AC characterized by:

a) viscosity of the final product ranges from 5 to 300 cps @ 106s−1, preferable 20 to 150 cps;

b) pH of the product ranges from 1.5 to 5, preferably 2 to 3; and c) level of QAC ranges from 0.5 wt % to 20 wt %, preferably from 1 wt % to 16 wt %, more preferably from 6 wt % to 12 wt % of softening active.

The preferred, typical cationic fabric softening components include water-insoluble quaternary-ammonium fabric softeners, the most commonly used having been di-long alkyl chain ammonium chloride or methyl sulfate. Preferred softeners include but not limited to:

a) rapidly biodegradable quaternary ammonium compounds which contain 1 or more ester bonds situated between the quaternary-ammonium group and the long alkyl chain (eg., TEA ester quats, DEEDMAC, HEQ); and b) non-ester QAC (eg., ditallow dimethylammonium chloride (DTDMAC), dihydrogenated tallow dimethylammonium chloride, dihydrogenated tallow dimethylammonium methylsulfate, distearyl dimethylammonium chloride, dioleyl dimethylammonium chloride, dipalmityl hydroxyethyl methylammonium chloride, stearyl benzyl dimethylammonium chloride, tallow trimethylammonium chloride, hydrogenated tallow trimethylammonium chloride, C12-14 alkyl hydroxyethyl dimethylammonium chloride, C12-18 alkyl dihydroxyethyl methylammonium chloride, di(stearoyloxyethyl) dimethylammonium chloride (DSOEDMAC), di(tallowoyloxyethyl) dimethylammonium chloride, ditallow imidazolinium methylsulfate, 1-(2-tallowylamidoethyl)-2-tallowyl imidazolinium methylsulfate).

A first group of quaternary ammonium compounds (QACs) suitable for use in the present invention is represented by formula (I):

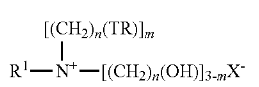

(I)

wherein each R is independently selected from a C1-35 alkyl or alkenyl group; R1 represents a C1-4 alkyl, C2-4 alkenyl or a C1-4 hydroxyalkyl group; T is generally O—CO. (i.e. an ester group bound to R via its carbon atom), but may alternatively be CO-0 (i.e. an ester group bound to R via its oxygen atom); n is a number selected from 1 to 4; m is a number selected from 1, 2, or 3; and X is an anionic counter-ion, such as a halide or alkyl sulphate, e.g. chloride or methylsulphate. Di-esters variants of formula I (i.e. m=2) are preferred and typically have mono- and tri-ester analogues associated with them. Especially preferred agents are preparations which are rich in the di-esters of triethanolammonium methylsulfate, otherwise referred to as “TEA ester quats”. Commercial examples include Stepantex™ UL85, ex Stepan, Prapagen™ TQL, ex Clariant, and Tetranyl™ AHT-1, ex Kao, (both di-[hardened tallow ester] of triethanolammonium methylsulphate), AT-1 (di-[tallow ester] of triethanolammonium methylsulphate), and L5/90 (di-[palm ester] of triethanolammonium methylsulphate), both ex Kao, and Rewoquat™ WE15 (a di-ester of triethanolammonium methylsulphate having fatty acyl residues deriving from C10-C20 and C16-C18 unsaturated fatty acids), ex Evonik. Also suitable are soft quaternary ammonium actives such as Stepantex VK90, Stepantex VT90, SP88 (ex-Stepan), Prapagen TQ (ex-Clariant), Dehyquart AU-57 (ex-Cognis), Rewoquat WE18 (ex-Degussa) and Tetranyl L190 P, Tetranyl L190 SP and Tetranyl L190 S (all ex-Kao).

A second group of QACs suitable for use in the invention is represented by formula (II):

$$(R^1)_2—N^+—[(CH_2)_n\text{-}T\text{-}R^2]_2X^- \quad \text{(II)}$$

wherein each R1 group is independently selected from C1-4 alkyl, or C2-4 alkenyl groups; and Wherein each R2 group is independently selected from C8-28 alkyl or alkenyl groups; and n, T, and X— are as defined above. Preferred materials of this second group include bis(2tallwoyloxy-ethyl)dimethyl ammonium chloride and hardened versions thereof.

A third group of QACs suitable for use in the invention is represented by formula (III):

(III)

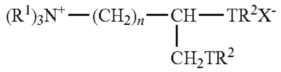

wherein each R1 group is independently selected from C1-4 alkyl, hydroxyalkyl or C2-4 alkenyl groups; and wherein each R2 group is independently selected from C8-28 alkyl or alkenyl groups; and wherein n, T, and X are as defined above. Preferred materials of this second group include 1,2 bis[tallowoyloxy]-3-trimethylammonium propane chloride, 1,2 bis[hardened tallowoyloxy]-3-trimethylammonium propane chloride, 1,2-bis[oleoyloxy]-3 trimethylammonium propane chloride, and 1,2 bis[stearoyloxy]-3-trimethylammonium propane chloride. Such materials are described in U.S. Pat. No. 4,137,180 (Lever Brothers). Preferably, these materials also comprise an amount of the corresponding mono-ester.

Non Ester quaternary ammonium compounds may be a non-ester quaternary ammonium material represented by formula (IV):

(IV)

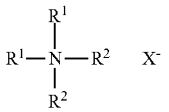

wherein each R1 group is independently selected from C1-4 alkyl, hydroxyalkyl or C2-4 alkenyl groups; each R2 group is independently selected from C5-28 alkyl or alkenyl groups, and X is as defined above.

The fabric softening product of the present invention may optionally contain a non-cationic softening material, which is preferably an oily sugar derivative. An oily sugar derivative is a liquid or soft solid derivative of a cyclic polyol (CPE) or of a reduced saccharide (RSE), said derivative resulting from 35 to 100% of the hydroxyl groups in said polyol or in said saccharide being esterified or etherified. The derivative has two or more ester or ether groups independently attached to a C8-C22 alkyl or alkenyl chain. Advantageously, the CPE or RSE does not have any substantial crystalline character at 20° C. Instead it is preferably in a liquid or soft solid state as herein defined at 20° C. The liquid or soft solid (as hereinafter defined) CPEs or RSEs suitable for use in the present invention result from 35 to 100% of the hydroxyl groups of the starting cyclic polyol or reduced saccharide being esterified or etherified with groups such that the CPEs or RSEs are in the required liquid or soft solid state. These groups typically contain unsaturation, branching or mixed chain lengths. Typically the CPEs or RSEs have 3 or more ester or ether groups or mixtures thereof, for example 3 to 8, especially 3 to 5. It is preferred if two or more of the ester or ether groups of the CPE or RSE are independently of one another attached to a C5 to C22 alkyl or alkenyl chain. The C5 to C22 alkyl or alkenyl groups may be branched or linear carbon chains.

The fabric softening product of the present invention may further contain optional ingredients including:

(a) fragrances (non-encapsulated as further described below);

(b) co-actives, co-softeners and fatty complexing agents;

(c) fatty acid;

(d) rheology modifiers;

(e) non-ionic surfactants;

(f) Silicones;

(g) cationic polysaccharide;

(h) non-ionic polysaccharide; and (i) further optional ingredients.

Co-softeners, also referred to as co-softeners and fatty complexing agents may be used. When employed, they are typically present at from 0.1% to 20% and particularly at from 0.1% to 5%, based on the total weight of the composition. Preferred co-softeners include fatty alcohols, fatty esters, and fatty N-oxides. Fatty esters that may be employed include fatty monoesters, such as glycerol monostearate, fatty sugar esters, such as those disclosed WO 01/46361 (Unilever). The compositions of the present invention may comprise a co-actives. Especially suitable fatty complexing agents include fatty alcohols and fatty acids. Of these, fatty alcohols are most preferred. Without being bound by theory it is believed that the fatty complexing material improves the viscosity profile of the composition by complexing with mono-ester component of the fabric conditioner material thereby providing a composition which has relatively higher levels of di-ester and tri-ester linked components. The di-ester and tri-ester linked components are more stable and do not affect initial viscosity as detrimentally as the mono-ester component.

It is also believed that the higher levels of mono-ester linked component present in fabric softening product comprising quaternary ammonium materials based on TEA may destabilize the composition through depletion flocculation. By using the co-active material to complex with the mono-ester linked component, depletion flocculation is significantly reduced. In other words, the co-active at the increased levels, as required by the present invention, "neutralizes" the mono-ester linked component of the quaternary ammonium material. This in situ di-ester generation from mono-ester and fatty alcohol also improves the softening of the composition. Preferred fatty acids include hardened tallow fatty acid (available under the trade name Pristerene™, ex Croda). Preferred fatty alcohols include hardened tallow alcohol (available under the trade names Stenol™ and Hydrenol™, ex BASF and Laurex™ CS, ex Huntsman). The fatty complexing agent may be preferably present in an amount greater than 0.1 to 5% by weight based on the total weight of the composition. More preferably, the fatty component may be present in an amount of from 0.2 to 4%. The weight ratio of the mono-ester component of the quaternary ammonium fabric softening material to the fatty complexing agent is preferably from 5:1 to 1:5, more preferably 4:1 to 1:4, most preferably 3:1 to 1:3, e.g. 2:1 to 1:2.

The fabric softening product may further comprise a fatty acid compound. Suitable fatty acids include those containing from 10 to 25, preferably from 12 to 25 total carbon atoms, with the fatty moiety containing from 10 to 22, preferably from 16 to 22, carbon atoms. The level of unsaturation of the tallow chain can be measured by the Iodine Value (IV) of the corresponding fatty acid, which in the present case should preferably be in the range of from 5 to 100, more preferably in the range of from 0 to 25. Specific examples of fatty acid compounds suitable for use in the aqueous fabric softening compositions herein include compounds selected from lauric acid, myristic acid, palmitic acid, stearic acid, arachidic acid, behenic acid, oleic acid, coconut fatty acid, tallow fatty acid, partially hydrogenated tallow fatty acid and mixtures thereof. A most preferred fatty acid compound is tallow fatty acid with an Iodine Value (IV) of 18. The fatty acids, when present, will preferably be in a weight ratio of said biodegradable fabric softening agents to said fatty acid compounds of from 25:1 to 6.5:1, more preferably from 20:1 to 10:1 and most preferably from 20:1 to 15:1.

The fabric softening product may further comprise a rheology modifiers. Rheology modifiers particularly useful in the compositions of the invention include those described in WO2010/078959 (SNF S.A.S.). These are crosslinked water swellable cationic copolymers of at least one cationic monomer and optionally other non-ionic and/or anionic monomers. Preferred polymers of this type are copolymers of acrylamide and methacrylate. Most preferred are copolymers of acrylamide and trimethylaminoethylacrylate chloride. The composition may comprise one crosslinked water swellable cationic copolymer. In one embodiment of the invention it may be preferred that the composition comprises at least two different crosslinked water swellable cationic copolymers. Preferred polymers comprise less than 25% of water soluble polymers by weight of the total polymer, preferably less than 20%, and most preferably less than 15%, and a cross-linking agent concentration of from 500 ppm to 5000 ppm by weight relative to the polymer, preferably from 750 ppm to 5000 ppm by weight, more preferably from 1000 to 4500 ppm by weight as determined by a suitable metering method such as the following method described on page 4 of patent EP 2373773 B 1. Suitable cationic monomers are selected from the group consisting of the following monomers and derivatives and their quaternary or acid salts: dimethylaminopropylmethacrylamide, dimethylaminopropylacrylamide, diallylamine, methyldiallylamine, dialkylaminoalkyl-acrylates and methacrylates, dialkylaminoalkylacrylamides or -methacrylamides.

Following is a non-restrictive list of monomers performing a non-ionic function: acrylamide, methacrylamide, N-Alkyl acrylamide, N-vinyl pyrrolidone, N-vinyl formamide, N-vinyl acetamide, vinylacetate, vinyl alcohol, acrylate esters, allyl alcohol. Following is a non-restrictive list of monomers performing an anionic function: acrylic acid, methacrylic acid, itaconic acid, crotonic acid, maleic acid, fumaric acid, as well as monomers performing a sulfonic acid or phosphonic acid functions, such as 2-acrylamido-2-methyl propane sulfonic acid (ATBS) etc. The monomers may also contain hydrophobic groups.

Following is a non-restrictive list of cross-linking agents: methylene bisacrylamide (MBA), ethylene glycol diacrylate, polyethylene glycol dimethacrylate, diacrylamide, triallylamine, cyanomethylacrylate, vinyl oxyethylacrylate or methacrylate and formaldehyde, glyoxal, compounds of the glycidyl ether type such as ethyleneglycol diglycidyl ether, or the epoxydes or any other means familiar to the expert permitting cross-linking. By way of preeminent preference the cross-linking rate preferably ranges from 800 to 5000 ppm (on the basis of methylene bisacrylamide) by weight relative to the polymer or equivalent cross-linking with a cross-linking agent of different efficiency.

As described in US 2002/0132749 and Research Disclosure 4291 16, the degree of nonlinearity can additionally be controlled by the inclusion of chain transfer agents (such as isopropyl alcohol, sodium hypophosphite, mercaptoethanol) in the polymerization mixture in order to control the polymeric chain's length and the cross-linking density. The amount of polymer used in the compositions of the invention is suitably from 0.001 to 0.5 wt %, preferably from 0.005 to 0.4 wt %, more preferably from 0.05 to 0.35 wt % and most preferably from 0.1 to 0.25 wt %, by weight of the total composition. An example of a preferred polymer is Flosoft 270LS ex SNF and Flosoft 222 ex SNF.

The fabric softening product may further comprise a nonionic surfactant. Typically these can be included for the purpose of stabilizing the compositions. Suitable nonionic surfactants include addition products of ethylene oxide with fatty alcohols, fatty acids and fatty amines. Any of the alkoxylated materials of the particular type described hereinafter can be used as the nonionic surfactant. Suitable surfactants are substantially water soluble surfactants of the general formula (V): R—Y—(C2H4O)z-CH2-CH2-OH (V) where R is selected from the group consisting of primary, secondary and branched chain alkyl and/or acyl hydrocarbyl groups; primary, secondary and branched chain alkenyl hydrocarbyl groups; and primary, secondary and branched chain alkenyl-substituted phenolic hydrocarbyl groups; the hydrocarbyl groups having a chain length of from 8 to about 25, preferably 10 to 20, e.g. 14 to 18 carbon atoms.

In the general formula for the ethoxylated nonionic surfactant, Y is typically: —O—, —C(O)0-, —C(O)N(R)— or —C(O)N(R)R in which R has the meaning given above for formula (V), or can be hydrogen; and Z is at least about 8, preferably at least about 10 or 11. Preferably the nonionic surfactant has an HLB of from about 7 to about 20, more preferably from 10 to 18, eg. 12 to 16. Genapol™ C200 (Clariant) based on coco chain and 20 EO groups is an example of a suitable nonionic surfactant. If present, the nonionic surfactant is present in an amount from 0.01 to 10%, more preferably 0.1 to 5 by weight, based on the total weight of the composition. Lutensol™ AT25 (BASF) based on coco chain and 25 EO groups is an example of a suitable non-ionic surfactant. Other suitable surfactants include Renex 36 (Trideceth-6), ex Croda; Tergitol 15-S3, ex Dow Chemical Co.; Dihydrol LT7, ex Thai Ethoxylate ltd; Cremophor CO40, ex BASF and Neodol 91-8, ex Shell.

The fabric softening product of the invention may further contain a silicone based fabric softening agent. Preferably the fabric softening silicone is a polydimethylsiloxane. The fabric softening silicones include but are not limited to 1) non-functionalized silicones such as polydimethylsiloxane (PDMS) or alkyl (or alkoxy) functional silicones 2) functionalized silicones or copolymers with one or more different types of functional groups such as amino, phenyl, polyether, acrylate, siliconhydride, carboxylic acid, quaternized nitrogen, etc.

Suitable silicones may be selected from polydialkylsiloxanes, preferably polydimethylsiloxane more preferably amino functionalized silicones; anionic silicones and carboxyl functionalised silicone. An amino silicone that may also be used, for example, Arristan 64, ex CHT or Wacker CT45E, ex Wacker. In terms of silicone emulsions, the particle size can be in the range from about 1 nm to 100 microns and preferably from about 10 nm to about 10 microns including microemulsions (<150 nm), standard emulsions (about 200 nm to about 500 nm) and macroemulsions (about 1 micron to about 20 microns).

The fabric softening product may further comprise at least one cationic polysaccharide. The cationic polysaccharide can be obtained by chemically modifying polysaccharides, generally natural polysaccharides. By such modification, cationic side groups can be introduced into the polysaccharide backbone The cationic polysaccharides are not limited to: cationic cellulose and derivatives thereof, cationic starch and derivatives thereof, cationic callose and derivatives thereof, cationic xylan and derivatives thereof, cationic mannan and derivatives thereof, cationic galactomannan and derivatives thereof, such as cationic guar and derivatives thereof. Cationic celluloses which are suitable include cellulose ethers comprising quaternary ammonium groups, cationic cellulose copolymers or celluloses grafted with a water-soluble quaternary ammonium monomer.

The cellulose ethers comprising quaternary ammonium groups are described in French patent 1,492,597 and in particular include the polymers sold under the names "JR" (JR 400, JR 125, JR 30M) or "LR" (LR 400, LR 30M) by the company Dow. These polymers are also defined in the CTFA dictionary as hydroxyethylcellulose quaternary ammoniums that have reacted with an epoxide substituted with a trimethylammonium group. Suitable cationic celluloses also include LR3000 KC from company Solvay. The cationic cellulose copolymers or the celluloses grafted with a water-soluble quaternary ammonium monomer are described especially in patent U.S. Pat. No. 4,131,576, such as hydroxyalkylcelluloses, for instance hydroxymethyl-, hydroxyethyl- or hydroxypropylcelluloses grafted especially with a methacryloyl-ethyltrimethylammonium, methacrylamidopropyltrimethylammonium or dimethyl-diallylammonium salt. The commercial products corresponding to this definition are more particularly the products sold under the names Celquat® L 200 and Celquat® H 100 by the company Akzo Nobel. Cationic starches suitable for the present invention include the products sold under Polygelo® (cationic starches from Sigma), the products sold under Softgel®, Amylofax® and Solvitose® (cationic starches from Avebe), CATO from National Starch. Suitable cationic galactomannans can be those derived from Fenugreek Gum, Konjac Gum, Tara Gum, Cassia Gum or Guar Gum. The cationic polysaccharide, of the present invention may have an average Molecular Weight (Mw) of between 100,000 daltons and 3,500,000 daltons, preferably between 100,000 daltons and 1,500,000 daltons, more preferably between 100,000 daltons and 1,000,000 daltons.

The fabric softening product of the present invention preferably comprises from 0.01 to 2 wt % of cationic polysaccharide based on the total weight of the composition. More preferably, 0.025 to 1 wt % of cationic polysaccharide based on the total weight of the composition. Most preferably, 0.04 to 0.8 wt % of cationic polysaccharide based on the total weight of the composition.

In the context of the present application, the term "Degree of Substitution (DS)" of cationic polysaccharides, such as cationic guars, is the average number of hydroxyl groups substituted per sugar unit. DS may notably represent the number of the carboxymethyl groups per sugar unit. DS may be determined by titration. The DS of the cationic polysaccharide, is preferably in the range of 0.01 to 1, more preferably 0.05 to 1, most preferably 0.05 to 0.2. In the context of the present application, "Charge Density (CD)" of cationic polysaccharides, such as cationic guars, means the ratio of the number of positive charges on a monomeric unit of which a polymer is comprised to the molecular weight of said monomeric unit. CD of the cationic polysaccharide, such as the cationic guar, is preferably in the range of 0.1 to 3 (meq/gm), more preferably 0.1 to 2 (meq/gm), most preferably 0.1 to 1 (meq/gm).

The fabric softening product may further comprise at least one non-ionic polysaccharide. The nonionic polysaccharide can be a modified nonionic polysaccharide or a non-modified nonionic polysaccharide. The modified non-ionic polysaccharide may comprise hydroxyalkylation and/or esterification. In the context of the present application, the level of modification of non-ionic polysaccharides can be characterized by Molar Substitution (MS), which means the average number of moles of substituents, such as hydroxypropyl groups, per mole of the monosaccharide unit. MS can be determined by the Zeisel-GC method, notably based on the following literature reference: K. L. Hodges, W. E. Kester, D. L. Wiederrich, and J. A. Grover, "Determination of Alkoxyl Substitution in Cellulose Ethers by Zeisel-Gas Chromatography", Analytical Chemistry, Vol. 5 1, No. 13, November 1979. Preferably, the MS of the modified non-ionic polysaccharide is in the range of 0 to 3, more preferably 0.1 to 3 and most preferably 0.1 to 2.

The nonionic polysaccharide of the present invention may be especially chosen from glucans, modified or non-modified starches (such as those derived, for example, from cereals, for instance wheat, corn or rice, from vegetables, for instance yellow pea, and tubers, for instance potato or cassava), amylose, amylopectin, glycogen, dextrans, celluloses and derivatives thereof (methylcelluloses, hydroxyalkylcelluloses, ethylhydroxyethylcelluloses), mannans, xylans, lignins, arabans, galactans, galacturonans, chitin, chitosans, glucuronoxylans, arabinoxylans, xyloglucans, glucomannans, pectic acids and pectins, arabinogalactans, carrageenans, agars, gum arables, gum tragacanths, ghatti gums, karaya gums, carob gums, galactomannans such as guars and nonionic derivatives thereof (hydroxypropyl guar), and mixtures thereof. Among the celluloses that are especially used are hydroxyethylcelluloses and hydroxypropylcelluloses. Mention may be made of the products sold under the names Klucel® EF, Klucel® H, Klucel® LHF, Klucel® MF and Klucel® G by the company Aqualon, and Cellosize® Polymer PCG-10 by the company Amerchol, and HEC, HPMC K200, HPMC K35M by the company Ashland.

The fabric softening product of the present invention preferably comprises from 0.01 to 2 wt % of non-ionic polysaccharide based on the total weight of the composition. More preferably, 0.025 to 1 wt % of non-ionic polysaccharide based on the total weight of the composition. Most preferably, 0.04 to 0.8 wt % of non-ionic polysaccharide based on the total weight of the composition. Preferably the fabric conditioning composition comprises combined weight of the cationic polysaccharide and non-ionic polysaccharide of 0.02 to 4 w.t. %, more preferably 0.05 to 2 w.t. % and most preferably 0.08 to 1.6 w.t. %. Preferably the ratio of the weight of the cationic polysaccharide in the composition and the weight of the nonionic polysaccharide in the composition is between 1:10 and 10:1, more preferably, between 1:3 and 3:1. In a preferred embodiment, the cationic polysaccharide and non-ionic polysaccharide are mixed prior to addition to the fabric conditioner composition. Preferably the mix is prepared as a suspension in water. Preferably, the ratio of the weight of the quaternary ammonium compound in the composition and the total weight of the cationic polysaccharide and the nonionic polysaccharide in the composition is between 100:1 and 2:1, more preferably, between 30:1 and 5:1.

The fabric softening product may comprise other ingredients of fabric conditioner liquids as will be known to the person skilled in the art. Among such materials there may be mentioned: antifoams, perfumes and fragrances (both free oil and encapsulated material), insect repellents, shading or hueing dyes, preservatives (e.g. bactericides), pH buffering agents, perfume carriers, hydrotropes, anti-redeposition agents, soil-release agents, polyelectrolytes, anti-shrinking agents, anti-wrinkle agents, anti-oxidants, dyes, colorants, sunscreens, anti-corrosion agents, drape imparting agents, anti-static agents, sequestrants and ironing aids. The products of the invention may contain pearlisers and/or opacifiers. A preferred sequestrant is HEDP, an abbreviation for Etidronic acid or 1-hydroxyethane 1,1-diphosphonic acid.

The fabric softening product of the present invention comprises water. The compositions are rinse-added softening compositions suitable for use in a laundry process. The compositions are pourable liquids. The liquid compositions have a pH ranging from about 2.0 to 7, preferably from about 2.2 to 5.5, most preferably about 2.5 to 4.5. The compositions may also contain pH modifiers preferably hydrochloric acid, lactic acid or sodium hydroxide. The composition is preferably a ready-to-use liquid comprising an aqueous phase. The aqueous phase may comprise water-soluble species, such as mineral salts or short chain (C1-C4) alcohols. The composition is preferably for use in the rinse cycle of a home textile laundering operation, where, it may be added directly in an undiluted state to a washing machine, e.g. through a dispenser drawer or, for a top-loading washing machine, directly into the drum. The compositions may also be used in a domestic hand-washing laundry operation.

The fabric softening product may typically be made by combining a melt comprising the fabric softening active with an aqueous phase. The polymer may be combined with the water phase, or it may be post dosed into the composition after combination of the melt and water phase. A preferred method of preparation is as follows:

1. Heat water to about 40 to 50° C. preferably above 45° C.
2. Add the Rheology modifiers to the water slowly, preferably over about 1 minute with stirring.
3. Mix thoroughly, preferably from 1 to 10 minutes.
4. Add any minor ingredients, such as antifoams, sequestrants and preservatives.
5. Melt the softening active and optional fatty alcohol together to form a co-melt.
6. Add the co-melt to the heated Water.
7. Add acid to the preferred pH, if required.
8. Add dyes and perfumes.
9. Cool.

Alternatively, but less preferably, the acid may be added at step 4 and/or the minor ingredients may be added after step 6. The addition of the encapsulated fragrance can be added at any stage within the process. However, it is preferable to add the encaps before the co-melt and more preferable to add the encapsulated fragrance before step 2.

The fragrance composition may be included in the fabric care product at any suitable level to achieve the fragrance intensity desired. In light of the increased perceived intensity of the fragrance compositions of this invention, the fragrance compositions can be used at reduced amounts, e.g., at an amount of less than about 1%, less than about 0.9%, 0.8%, 0.7%, 0.6%, 0.5%, 0.4%, 0.3%, 0.2%, 0.1%, or 0.05% by weight of the fabric care product. A fragrance composition may also be present within any range delimited by any pair of the foregoing values, such as between 0.05% and 0.9%, between 0.05% and 0.8% or between 1% and 0.8%, for example, based on the weight of the fabric care product.

The fragrance composition according to the present invention, either as a neat oil or encapsulated in a delivery system (eg., microcapsule) or a combination thereof, is well-suited for use, without limitation in fabric care products, preferably fabric conditioning products.

As used herein, "neat" or "neat oil" refers to a fragrance accord that is free from extraneous matter. A neat fragrance accord includes only fragrance ingredients and is unencapsulated and/or unbound from other compounds that could cause a delay in the release of the fragrance materials.

As used herein, "microcapsule" refers to a substantially spherical structure having a well-defined core and a well-defined envelope or wall. The "core" is composed of any fragrance composition submitted to microencapsulation. The "wall" is the structure formed by the microencapsulating material (eg., polymer, biopolymer, etc.) around the active material core being microencapsulated. Suitable non-limiting examples of microcapsules include ones disclosed in PCT Publications No. WO 2020/131875, WO 2020/131855 and WO 2020/131890.

Preferably, the microcapsules may be biodegradable. "Biodegradable" as used herein with respect to a material, such as a microcapsule as a whole and/or a biopolymer of the microcapsule shell, has no real or perceived health and/or environmental issues, and is capable of undergoing and/or does undergo physical, chemical, thermal, microbial and/or biological degradation. Ideally, a microcapsule and/or biopolymer is deemed "biodegradable" when the microcapsule and/or biopolymer passes one or more of the Organization for Economic Co-operation and Development (OECD) tests including, but not limited to OECD 301/310 (Ready biodegradation with 60% or more degradation in 28 days or 60 days), OECD 302 (inherent biodegradation with 70% or more biodegradation in 7 days or 14 days), the International Organization for Standardization (ISO) 17556 (solid stimulation studies with 90% or more biodegradation relative to reference in 6 months soil), ISO 14851 (fresh water stimulation studies with 90% or more biodegradation relative to reference in 24 months in water), ISO 18830 (marine sediment stimulation studies with 90% or more biodegradation relative to reference in 24 months in water), OECD 307 (soil stimulation studies with a half life ti/2 180 days or less), OECD 308 (sediment stimulation studies with a half life 180 days or less), and OECD 309 (water stimulation studies with a half life 60 days or less). The composition is deemed biodegradable if it passes other testing methods such as ASTM D5988 and ASTM D5210. In particular embodiments, the microcapsules are readily biodegradable as determined using the OECD 310 test. The pass level for ready biodegradability under OECD 310 is 60% of CO2 production is reached within the 60-day period of the test. Suitable non-limiting examples of biodegradable microcapsules include ones disclosed in PCT Publication Nos. WO 2020/131866, WO 2020/131879, WO 2020/131956, WO 2020/209907, WO 2020/209908, WO 2020/009909 and WO 2020/229744.

Some embodiments of the present invention, the compositions contain one or more additional microcapsules (eg., a second, a third, a fourth, fifth, or sixth microcapsule). The one or more additional microcapsules are different from each other in term of microcapsule size, microcapsule wall forming polymer, microcapsule cross-linkers in the wall, or encapsulated fragrance compositions. The microcapsules can be in a dry form (eg., spray-dried) or in a slurry (eg., containing 30% to 70% water).

The invention also provides a method for enhancing the perceived intensity of a fragrance by mixing a fragrance component with isopropyl myristate to form a fragrance composition, wherein the fragrance composition has an enhanced perceived intensity compared to a control composition, and wherein the control composition consists of the same contents by identity and quantity as the fragrance composition but without the isopropyl myristate. For the purposes of this invention, "perceived intensity," "perceived fragrance intensity," "perceived fragrance performance" or "perceived performance" are used interchangeably to refer to the intensity of a fragrance as perceived by a consumer.

Such odor characteristics of a fragrance composition are typically assessed under different conditions by trained panelists that are capable of differentiating unambiguously the odor of a given fragrance composition under a first condition, for example during or after dilution of a perfumed product containing said fragrance composition, or on a substrate wetted with said product, from that of the same perfumed product, but under a second condition, for example after said product has dried on the substrate. Under such conditions, the difference is deemed to be consumer noticeable, that is, a majority of consumers will perceive the change of odor from said first condition to said second condition. In certain aspects of this invention, an enhancement in perceived fragrance intensity is notable when the fragrance composition is applied in a fabric care product under dry stage conditions.

EXAMPLES

The following non-limiting examples are provided to further illustrate the present invention and are not to be construed as limitations of the present invention, as many variations of the present invention are possible without departing from its spirit or scope.

Example 1: IPM Improves Performance at Dry Stage

Fragrance Formulations. Two high performance fragrance formulations (indicated as USC fragrances) according to the present invention were prepared as neat oils (Table 2). In parallel, a traditional or control fragrance formulation was prepared as a neat oil (Table 2).

TABLE 2

| | | USC | |
|---|---|---|---|
| Ingredient name | Control | 1 | 2 |
| ACET C-6 | 4.00% | — | — |
| ACETOPHENONE | 0.40% | — | — |
| ADOXAL TOCO | 0.55% | — | — |
| ALD AA TRIPLAL BHT | 0.92% | — | 0.77% |
| ALD C-11 ULENIC TOCO | 2.80% | — | — |
| ALD C-12 LAURIC TOCO | 3.85% | — | — |
| ALD C-12 MNA TOCO | 3.05% | 10.00% | — |
| ALD C-18 | — | — | 9.23% |
| ALLYL PHENOXY ACET | 0.44% | — | — |
| AMBERMOR EX | 0.12% | 20.00% | 6.15% |
| AMBRINOL 95 PRG 10% DPG | — | — | 1.54% |
| AMYL SAL | 2.35% | — | — |
| AQUAFLORA TOCO | — | — | 1.54% |
| AUBEPINE | 1.25% | — | — |
| BENZ ACET | 2.85% | — | — |
| BENZ ACETONE | 0.16% | — | — |
| BENZ SAL | 0.27% | — | — |
| BUTYL ACET | 0.03% | — | — |
| CALONE | — | — | 6.92% |
| CASHMERAN | — | 20.00% | — |
| CEDRAMBER | 0.02% | — | — |
| CITRONELLOL 950 | 1.45% | — | — |
| CITRONELLYL ACET | 0.02% | — | — |
| CORANOL (ELINCS) EXCL | 0.23% | — | — |
| CRISTALFIZZ | — | — | 0.77% |
| CYCLAMAL TOCO | 3.30% | — | — |
| CYCLAPROP | 0.05% | — | — |

TABLE 2-continued

| | | USC | |
|---|---|---|---|
| Ingredient name | Control | 1 | 2 |
| CYCLOHEXYL SAL (ELINCS) | 0.25% | — | — |
| DAMASCENONE TOTAL TOCO | — | — | 0.77% |
| DAMASCONE DELTA BHT | 0.30% | — | 1.54% |
| DECALACTONE, DELTA | — | — | 4.92% |
| DECALACTONE, GAMMA | 0.53% | — | — |
| DIHYDRO MYRCENOL | 12.85% | — | — |
| DIMETH BENZ CARB ACET | 2.65% | — | — |
| DOWANOL DPM | 0.11% | — | — |
| DUPICAL TOCO | — | — | 7.38% |
| ETH LINALOOL TOCO | 0.03% | — | — |
| ETH SAL | — | — | 1.54% |
| ETH VANILLIN | 0.08% | — | — |
| ETHYLENE BRASSYLATE (ASTRATONE) | 0.14% | — | — |
| EUGENOL NAT EX CLOVE LEAF OIL | 2.40% | — | — |
| FLORHYDRAL TOCO (ELINCS) | 0.36% | — | — |
| FLORIFFOL (ELINCS) TOCO | 2.45% | — | — |
| GALBASCONE ALPHA 95 PRG | 0.06% | — | — |
| GERANIOL 980 PURE | 1.05% | — | — |
| GERANYL PROP | 0.04% | — | — |
| HABANOLIDE (ELINCS) | 1.05% | — | — |
| HELIONAL | 0.02% | — | — |
| HELIOTROPINE (PIPERONAL) (USDEA) | 0.32% | — | — |
| HELVETOLIDE (ELINCS) | 1.45% | — | — |
| HEXADECANOLIDE | — | — | 3.85% |
| HEXENOL, TRANS 2, | — | — | 0.77% |
| HEXYL CINN ALD TBHQ | 4.00% | — | — |
| HEXYL SAL | 1.95% | — | — |
| HOMO CYCLOCITRAL, BETA BHT | — | — | 0.31% |
| HYSANDOL | — | — | 4.62% |
| IONONE ALPHA BHT | 0.81% | — | — |
| ISO AMYL BUTY | 0.57% | — | — |
| ISO BUTYL QUINOLINE 10% TEC | 0.10% | — | — |
| ISO E SUPER TOCO | 0.90% | — | — |
| ISO JASMONE PURE BHT | — | — | 2.31% |
| JAVANOL TT (ELINCS) | — | — | 0.77% |
| LINALOOL PURE EX PINENE | 13.60% | — | — |
| LINALYL ACET | 0.05% | — | — |
| LINDENOL | 0.40% | — | — |
| MALTOL (PALATONE) | — | — | 0.15% |
| METH CEDRYL KETONE | 0.04% | — | — |
| METH DH JASMONATE | 3.10% | — | — |
| METH FURFURAL, 5, | — | — | 1.54% |
| METH LAITONE 10 PCT DPG | — | — | 3.08% |
| METH NONYL KETONE | 0.06% | — | — |
| MUSCEMOR (ELINCS) | — | 20.00% | 9.23% |
| NEROL SUPER VERNOL | 0.58% | — | — |
| NONADIENAL 2-6 DIETH ACETAL 1% DPG | — | — | 1.54% |
| OCTALACTONE GAMMA | — | — | 1.54% |
| OPERANID (ELINCS) | — | — | 13.85% |
| PATCHOULI OIL LIGHT BLO | 6.50% | — | — |
| PAXAMBER BHT | 0.10% | — | — |
| PEONILE (ELINCS) | 0.07% | — | — |
| PHEN ACETALD (MXDEA) | — | — | 0.31% |
| PHEN ETH ALC WHITE EXTRA (MXDEA) | 2.20% | — | — |
| PHENOXANOL | 0.73% | — | — |
| PHENOXY ETHYL ISO BUTYRATE | 0.05% | — | — |
| PINO ACETALD TOCO | — | 5.00% | — |
| ROSE OXIDE PRG TOCO | — | — | 3.08% |
| ROSE OXIDE TOCO | 1.25% | — | — |
| ROSETHYL | — | 20.00% | — |
| SAFRANAL TOCO 10% DPG | — | — | 3.08% |
| SINENSAL NATURAL 20 EX ORANGE | — | — | 0.77% |
| STEMONE | — | — | 4.62% |
| STYRALYL ACET | 0.06% | — | — |
| TONKALACTONE | — | — | 0.77% |
| UNDECALACTONE GAMMA COEUR | 0.09% | — | — |
| UNDECAVERTOL TOCO | 3.70% | — | — |
| VALEROLACTONE, GAMMA | — | — | 0.77% |
| VERTENEX | 4.75% | — | — |

TABLE 2-continued

| | | USC | |
|---|---|---|---|
| Ingredient name | Control | 1 | 2 |
| YARAYARA EXTRA PRG | — | 5.00% | — |
| YSAMBER K (ELINCS) | 0.07% | — | — |
| Total | 100.00% | 100.00% | 100.00% |

Sample Preparation. All fragrance formulations were compounded with and without IPM at two different concentration levels (high (10%) and low (2.66%)) and were applied in a fabric conditioner base (Table 3). All samples were aged for 7 days prior to the sensory test. The amount of fragrance oil (g) was kept the same for all samples.

TABLE 3

| Sample Description | Fragrance (g) | IPM (g) | Dosage in base (%) |
|---|---|---|---|
| Control | 0.08 | — | 0.08 |
| 10% control + 90% IPM | 0.08 | 0.72 | 0.80 |
| 2.66% control + 97.33% IPM | 0.08 | 2.70 | 3.00 |
| USC 1 | 0.08 | — | 0.08 |
| 10% USC 1 + 90% IPM | 0.08 | 0.72 | 0.80 |
| 2.66% USC 1 + 97.33% IPM | 0.08 | 2.70 | 3.00 |
| USC 2 | 0.08 | — | 0.08 |
| 10% USC 2 + 90% IPM | 0.08 | 0.72 | 0.80 |
| 2.66% USC 2 + 97.33% IPM | 0.08 | 2.70 | 3.00 |

Wash Method. A total amount of 35 g of product (fabric conditioner containing fragrance) was used in all washes. A 2.2 kg set of laundry composed of big towels, T-shirts, pillowcases, dish towels, and mini-towels was evaluated using a front loader washing machine. A standard short program (60 minutes) at 40° C. with a 15.5-liter wash cycle and two 17-liter rinses was used. A regular commercial detergent was used for washing the samples and 35 g of the above-referenced fabric conditioner samples were added to the conditioner drawer of the washing machines. After line drying for 24 hours in the open air, sensory data were recorded for the towels.

Sensory Evaluations. All samples were evaluated at Point of Purchase (hereinafter "POP"), damp and dry stages by a sensory panel using the Label Magnitude Scale (LMS) from 0 to 99, wherein 3 represents "barely detectable," 7 represents "weak," 16 represents "moderate" and 32 represents "strong." Statistical analysis was conducted with JMP statistical software. ANOVA was then used with intensity as the dependable variable, panelists and samples as independent variable.

Figure 1B:
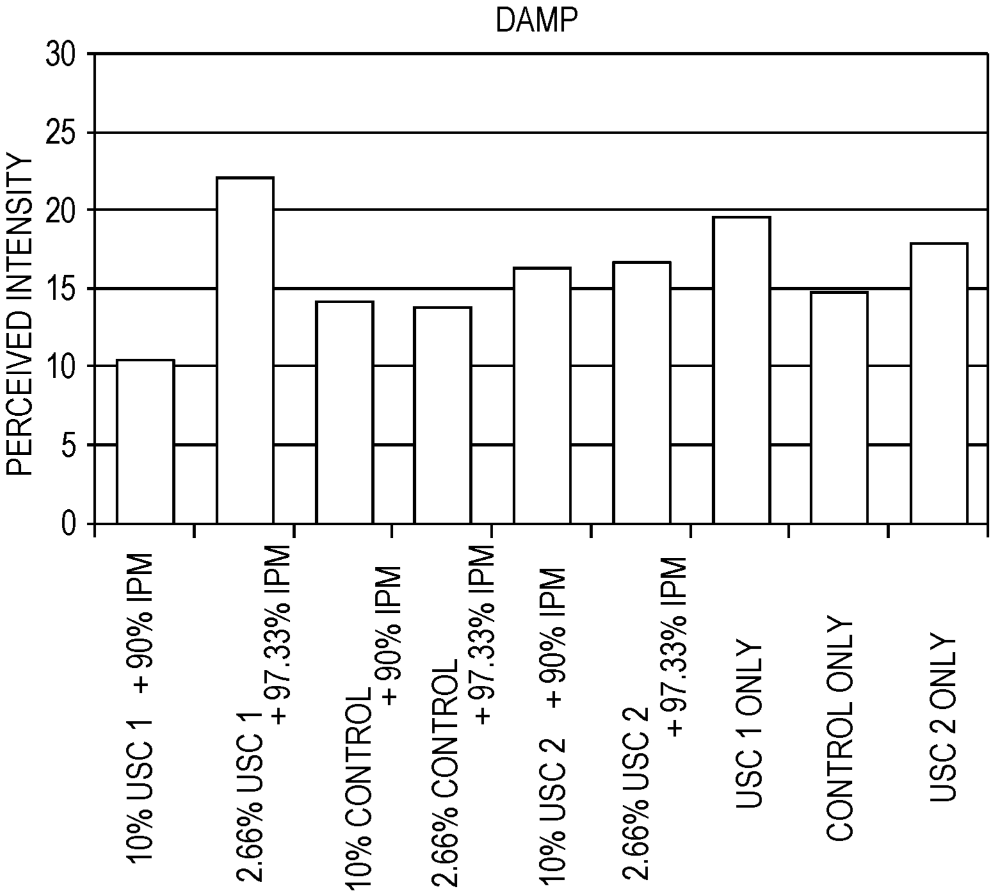
Figure 1C:
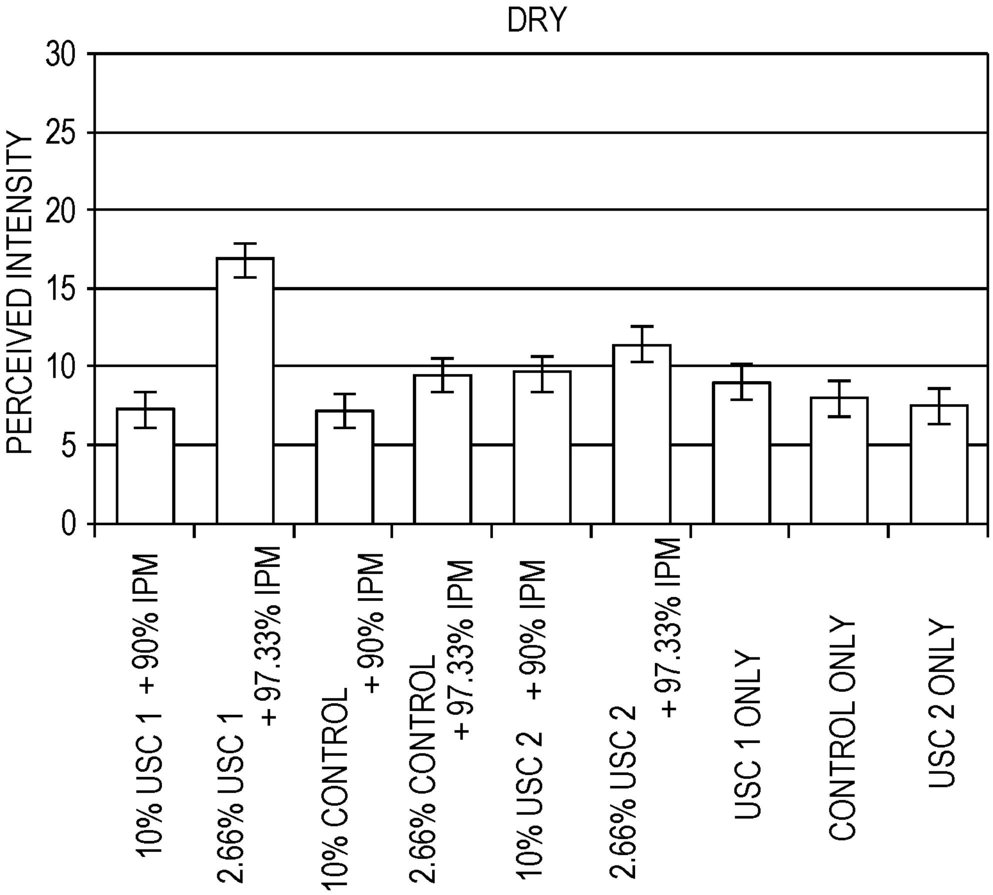

Results. Sensory evaluations indicated that while there was parity amongst all samples at both POP (FIG. 1A) and damp (FIG. 1B) stages, there was a significant improvement in the performance of USC 1 and USC 2 formulations diluted in IPM at the dry stage (FIG. 1C). In particular, at dosage levels of IPM above 90% (w/w, of the mixture fragrance+IPM) an improvement of the performance/intensity of the USC fragrances in the dry stage was observed. However, no performance improvement was noted at any stage when the control fragrance formulation was diluted with IPM.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "10%" is intended to mean "about 10%."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fabric care product comprising a fabric care active and a fragrance composition comprising a synergistic combination of a fragrance component, in an amount ≤10% by weight of the fragrance composition; and isopropyl myristate, in an amount ≥90% of the fragrance composition, wherein the fragrance component comprises at least 1% by weight of the fragrance component a fragrance selected from the group consisting of Decahydro-2,2,6,6,7,8,8-heptamethyl indenofuran; Octahydro-4,7-methano-1H-indene-5-acetaldehyde; Cyclohexyl Salicylate; (4E)-4,8-dimethyldeca-4,9-dienal; 1-(5,5-Dimethyl-1-cyclohexenyl)pent-4-en-1-one; [1-Methyl-2-[(1,2,2-trimethylbicyclo[3.1.0]hex-3-yl)methyl]cyclopropyl]methanol; 2-Methoxyethylbenzene; 3-Methylcyclopentadecenone; 2-Cyclohexylidene-2-phenylacetonitrile; 4-Methyl-2-phenyl-3,6-dihydro-2H-pyran & 4-Methyl-6-phenyl-3,6-dihydro-2H-pyran & 4-Methylene-2-phenyltetrahydro-2H-pyran mixture; (±)-γ-Nonalactone; 1,2,3,4,4a,5,6,7-Octahydro-2,5,5-trimethyl-2-naphthalenol; 7-Methyl-2H-1,5-benzodioxepin-3(4H)-one; 4-(Heptyloxy) -3-methylbutanal; μ-Damascenone, (2Z)-1-(2,6,6-Trimethyl -2-cyclohexen-1-yl)-2-buten-1-one; δ-Decalactone; 4-(octahydro-4,7-methano-5H-inden-5-ylidene)butanal; Ethyl salicylate; Hexadecanolide; trans-2-Hexen-1-ol; μ-Apo-8-carotenal; 1-[(1R,6R)-2,2,6-Trimethylcyclohexyl]hexan-3-ol; 2-Hexyl -2-cyclopenten-1-one; Maltol; 5-Methylfurfural; 8-Methyl -1-oxaspiro[4.5] decan-2-one; 3-Methyl-5-cyclopentadecen-1-one; (2E,6Z)-1,1-Diethoxy-2,6-nonadiene; γ-Octalactone; 3a,5, 6,7,8,8b-Hexahydro-2,2,6,6,7,8,8-heptamethyl-4H-indeno[4,5-d]-1,3-dioxole; Phenylacetaldehyde; 6,6-Dimethyl-2-norpinene-2-propionaldehyde; (-)-cis-Rose oxide, rose oxide; 1-(Ethoxymethyl)-2-methoxybenzene; 2,6,6-trimethylcyclohexa-1,3-diene-1-carbaldehyde; 2-dimethyl-10-methylene-2,6,11-dodecatrienal; N-(5-methylheptan-3-ylidene)hydroxylamine; 3-Ethylhexahydro-2(3H) -benzofuranone; γ-Valerolactone; and 2-Methoxynaphthalene.

2. The fabric care product of claim 1, wherein the weight ratio of the fragrance component to isopropyl myristate is in the range of about 10:90 to about 1:99.

3. The fabric care product of claim 1, wherein the fragrance composition is encapsulated within a microcapsule.

4. The fabric care product of claim 1, wherein said product is a scent booster, fabric detergent, fabric conditioner, rinse conditioner, fabric liquid conditioner, tumble drier sheet, fabric refresher, fabric refresher spray, ironing liquid, or fabric softener system.

5. The fabric care product of claim 1, wherein the fragrance composition is present in an amount of less than about 1% by weight of the fabric care product.

6. The fabric care product of claim 1, wherein the fragrance composition is encapsulated within a microcapsule.

* * * * *